United States Patent [19]

Flygenring

[11] Patent Number: 4,609,510
[45] Date of Patent: Sep. 2, 1986

[54] TIRE MANUFACTURING PROCESS

[75] Inventor: Robert G. Flygenring, Christchurch, New Zealand

[73] Assignee: The Firestone Tire & Rubber Company, Akron, Ohio

[21] Appl. No.: 684,828

[22] Filed: Dec. 21, 1984

[30] Foreign Application Priority Data

Dec. 22, 1983 [NZ] New Zealand ................. 206689

[51] Int. Cl.$^4$ ............................................. B29C 35/02
[52] U.S. Cl. ........................................ 264/39; 264/85; 264/297.5; 264/315
[58] Field of Search .................. 264/85, 315, 39, 297.5

[56] References Cited

U.S. PATENT DOCUMENTS

| | | | |
|---|---|---|---|
| 1,289,043 | 12/1918 | Comstock | 264/85 |
| 1,544,023 | 6/1925 | Minor | 264/85 |
| 1,600,693 | 9/1926 | Minor | |
| 1,746,357 | 2/1930 | Minor | 264/85 |
| 1,786,290 | 12/1930 | Denmire | |
| 3,937,778 | 2/1976 | Tanaka | 264/85 X |
| 4,027,543 | 6/1977 | Johnston | 74/231 R |
| 4,126,657 | 11/1978 | Gado | 264/85 |
| 4,222,721 | 9/1980 | Gado | 425/33 |
| 4,382,052 | 5/1983 | Arimatsu | 264/85 |

FOREIGN PATENT DOCUMENTS

| | | |
|---|---|---|
| 18261 | of 1929 | Australia . |
| 0050522 | 4/1982 | European Pat. Off. . |
| 1264754 | 3/1968 | Fed. Rep. of Germany . |
| 168660 | 10/1973 | New Zealand . |
| 168572 | 9/1974 | New Zealand . |

*Primary Examiner*—Jan Silbaugh
*Attorney, Agent, or Firm*—Ernst H. Ruf

[57] ABSTRACT

A tire manufacturing process of the type which employs a reusable rubber or the like curing bag or bladder. The process includes deflating, between curing cycles of the tire manufacturing process, the curing bag or bladder; preventing oxygen bearing medium entering the curing bag or bladder; and supplying a non-reactive medium upstream of the curing bag or bladder to maintain the bag or bladder in its unstretched state until the bag or bladder is next inflated.

6 Claims, No Drawings

TIRE MANUFACTURING PROCESS

TECHNICAL FIELD

The invention relates to tire manufacturing and more particularly to tire manufacturing utilising a rubber or the like curing bag or bladder.

BACKGROUND OF THE ART

A number of different machines are currently available for use in the curing of rubber tires during tire manufacturing processes. Examples of such machinery are those described in New Zealand Patent Specification Nos. 168572 and 168660. In these processes a reusable rubber or the like curing bag or bladder is during curing cycles inflated to force outward a green tire into parts of the tire mould. Normally each bag or bladder can be reused up to 200 times before it deteriorates under the pressures and temperatures involved in the curing process.

Deterioration of the bag or bladder, which is usually referred to as reversion, normally occurs because of oxidation due to oxygen being trapped in the bag or bladder as it is inflated. Over the years attempts have been made to reduce the rate at which reversion takes place and thus lengthen the reusable life of the bag or bladder. For example it is recognised that the use of an inert gas for pre-shaping of the bag or bladder within a green tire or purging of curing and/or cooling medium from the bag or bladder at completion of curing is advantageous because the insert gas acts as a preservative by preventing oxidation. For example in U.S. Pat. Nos. 4,126,657 and 4,222,721 the use of an inert gas for purging is disclosed while in European Patent Specification Nos. 0052522 and Australian Patent Specification No. 18261 an inert gas is disclosed as being used for pre-shaping purposes.

Despite these attempts at reducing the rate at which reversion occurs the effective reusable life of a bag or bladder has remained a problem as reversion has continued to take place at an unacceptable level. It is evident that even when an inert gas or indeed other non-reactive medium is employed for pre-shaping and/or purging, oxygen still becomes trapped in the bag or bladder. The main object of the present invention is thus to provide a tire manufacturing process in which the wear life of a curing bag or bladder is increased by reducing the rate at which reversion occurs due to oxygen being trapped in the bag or bladder.

DISCLOSURE OF THE INVENTION

In most tire manufacturing processes which use a curing bag or bladder it is normal upon completion of the curing stage to remove the curing medium from the bag or bladder, then pass a cooling medium through the bag or bladder and finally deflate the bag or bladder by drawing a vacuum in the curing bag or bladder and associated pipework. According to the present invention it has been discovered that if a non-reactive medium is supplied to the bag or bladder during the step of deflation to maintain the bag or bladder in its unstretched state until the bladder is next inflated then oxygen is prevented from being trapped in the bag or bladder when it is next inflated. After completion of a curing step the curing medium is removed by passing a cooling medium through the bag or bladder; thereafter, the cooling medium is purged from the bag or bladder via a gaseous medium while the bag or bladder is being deflated by drawing a vacuum to thus complete the tire manufacturing cycle.

According to the present invention there is provided a tire manufacturing process of the tire using a reusable rubber or the like curing bag or bladder which includes: deflating between curing cycles of the tyre manufacturing process the curing bag or bladder; preventing oxygen bearing medium from entering the curing bag or bladder; supplying a non-reactive medium upstream of the curing bag or bladder to maintain the bag or bladder in its unstretched state until the bag or bladder is next inflated.

The non-reactive medium can be a gas such as nitrogen and the like inert gas or dry saturated steam.

Further aspects of the invention will become apparent from the following description which is given by means of example only.

BEST MODE FOR CARRYING OUT THE INVENTION

In a tire manufacturing process which employs a curing bag or bladder the bag or bladder is deflated once the curing process has been completed. Deflation is carried out by a vacuum being drawn in the curing bag or bladder and its associated equipment so that the bag or bladder is deflated to an extent which enables ready removal of the cured tire and loading of a green tire. Once the green tire is loaded then the curing bag or bladder can be pre-shaped by a pressurized medium being applied to the curing bag or bladder. Following pre-shaping and closing of the tire forming mold the curing medium is applied to the bag or bladder whereby curing can take place. At completion of curing the curing medium is removed and a cooling medium applied to the bag or bladder and once this cooling medium is removed the bag or bladder is deflated to thereby complete a tire manufacturing cycle.

The present invention requires a non-reactive gaseous medium such as, for example, dry saturated steam or nitrogen and the like inert gas to be applied as the curing bag or bladder is deflated and maintained in its unextended state between curing cycles. Accordingly, to prevent air, which includes oxygen, from being drawn into the curing bag or bladder the associated pipework of the curing bag or bladder is maintained closed between cycles except for an upstream supply of the non-reactive gaseous medium.

The non-reactive gaseous medium is supplied upstream of the curing bag or bladder and is derived from a non-vacuum header line through a control valving arrangement. The pressure of the non-reactive gaseous medium in the pipework between the source of supply and the curing bag or bladder is regulated such that venting to atmosphere is prevented. The gaseous medium thus must be at a pressure sufficient to ensure that air is not permitted to bleed in around valves, joints, etc. in pipework upstream of the bag or bladder. The curing bag or bladder can therefore be kept in its ideal unstretched condition in the absence of oxygen due to the supply of the non-reactive gaseous medium.

In a preferred arrangement a flow restrictor is placed on the upstream control valve so that full vacuum is momentarily applied to the curing bag or bladder before the non-reactive gaseous medium flows. This ensures that the curing bag or bladder is during the initial stage of deflation positively pulled in.

It is preferred that the non-reactive gaseous medium is heated so that undue cooling of the interior of the curing bag or bladder does not take place. This heating can ideally be carried out by a heating element wound around the pipework immediately upstream of the control valve and preferably on a branch pipe between the control valve and header pipe.

In the foregoing description the term non-reactive gaseous medium is interpreted as relating to a gaseous medium which is not reactive with respect to the bladder material, i.e., it includes substantially no oxygen.

Tests effected indicate a substantial improvement in the wear life of the bladder or bag with up to 500 tires being used per bladder before replacement is necessary.

Thus by this invention there is provided a tire manufacturing process utilising a curing bladder or bag which increases substantially the wear life of the bladder or bag.

A particular example of the invention has been described herein by way of example and it is envisaged that improvements or modifications can take place without departing from the scope thereof.

I claim:

1. A tire manufacturing process of the type using a reusable rubber or similar curing bag or bladder to cure successive tires in a plurality of cycles, said process comprising deflating and purging the curing bag or bladder between successive curing cycles of said tire manufacturing process, and preventing oxygen bearing medium from entering said curing bag or bladder during said deflating and purging by supplying a non-reactive medium upstream of the curing bag or bladder at a positive pressure which is sufficient to prevent bleeding of air at joints, valves, and similar structure into a supply line along which said non-reactive medium travels when it is conducted to said curing bag or bladder, said curing bag or bladder being simultaneously deflated and purged by drawing a vacuum while said non-reactive medium is being supplied at said positive pressure, said drawn vacuum being maintained until said curing bag or bladder is inflated preparatory to a successive curing cycle.

2. A tire manufacturing process in accordance with claim 1 further comprising heating said non-reactive medium.

3. A tire manufacturing process in accordance with claim 1 wherein said non-reactive medium is an inert gas.

4. A tire manufacturing process in accordance with claim 3 wherein said inert gas is nitrogen.

5. A tire manufacturing process in accordance with claim 1 wherein said vacuum is initially drawn on said curing bag or bladder just prior to supply of said non-reactive gaseous medium.

6. A tire manufacturing process in accordance with claim 1 wherein the interior of said curing bag or bladder is heated by a heating element wound around pipework located immediately upstream of a valve for controlling the supply of said non-reactive medium.

* * * * *

UNITED STATES PATENT AND TRADEMARK OFFICE
CERTIFICATE OF CORRECTION

PATENT NO. : 4,609,510
DATED : September 2, 1986
INVENTOR(S) : Robert G. Flygenring It is certified that error appears in the above-identified patent and that said Letters Patent are hereby corrected as shown below:

```
Column 2, line 4, "of the tire using" should read --
               --of the type using--
```

Signed and Sealed this

Thirteenth Day of January, 1987

*Attest:*

DONALD J. QUIGG

*Attesting Officer*   *Commissioner of Patents and Trademarks*